United States Patent [19]

Luu

[11] Patent Number: 5,610,793
[45] Date of Patent: Mar. 11, 1997

[54] NO-MOV PROTECTION CIRCUITRY

[75] Inventor: Lionel T. V. Luu, Hong Kong, Hong Kong

[73] Assignee: Pacusma Co. Ltd., Hong Kong

[21] Appl. No.: 686,487

[22] Filed: Jul. 26, 1996

Related U.S. Application Data

[63] Continuation of Ser. No. 279,168, Jul. 22, 1994, abandoned.

[51] Int. Cl.$^6$ .................................................. H02H 3/22
[52] U.S. Cl. .............................................. 361/111; 361/56
[58] Field of Search .................................. 361/18, 56, 58, 361/91, 110, 111, 117, 118, 119, 126, 127

[56]  References Cited

U.S. PATENT DOCUMENTS

| | | | |
|---|---|---|---|
| 4,271,446 | 6/1981 | Comstock | 361/56 |
| 4,870,528 | 9/1989 | Harford | 361/56 |
| 4,870,534 | 9/1989 | Harford | 361/58 |
| 5,038,245 | 8/1991 | Gronskog | 361/56 |
| 5,388,021 | 2/1995 | Stahl | 361/56 |

*Primary Examiner*—Jeffrey A. Gaffin
*Assistant Examiner*—Ronald W. Leja
*Attorney, Agent, or Firm*—Ostrolenk, Faber, Gerb & Soffen, LLP

[57]  ABSTRACT

A three-stage surge protection circuit. The surge protection circuit includes input terminals for connection to an electrical power supply system and output terminals for connection to equipment to be protected. The three stages comprise: a surge dissipation stage coupled to the input terminals for storing and dissipating transient surge energy across the input terminals; a current limiting stage comprising a pair of inductors, each of which is coupled in series to a respective conductor from said input terminals, for limiting current surges; and a voltage clamping stage comprising an avalanche diode for accurately clamping the voltage to be supplied to the protected electrical equipment to a predetermined level. The surge protection circuit of the present invention can also be provided in a configuration for protecting electrical equipment powered by a three conductor and/or three-phase power system.

7 Claims, 7 Drawing Sheets

NO-MOV PROTECTION CIRCUITRY

This is a continuation of application Ser. No. 08/279,168 filed on Jul. 22, 1994, now abandoned.

BACKGROUND OF THE INVENTION

1. Field of the Invention

The present invention relates to circuitry for protecting equipment from electrical surges.

2. Description of the Related Art

Modern equipment which uses sophisticated micro-electronic circuitry is susceptible to electrical power disturbances. These disturbances come in different forms such as surges, spikes, noise, brownouts, and blackouts. Among these types of disturbances, blackouts occur least frequently. Brownouts occur more frequently. Blackouts and brownouts are the most expensive to protect against, requiring an uninterrupted power supply (UPS) to avoid. Surges, spikes, and noises occur frequently and can be protected against, to a considerable extent at reasonable cost, through the use of surge protectors. The present invention relates to such surge protectors.

Most equipment in use in the United States, such as computers, facsimile transmission machines, televisions, etc., is designed to operate at a voltage level of 120 volts rms. Voltage spikes above this level can damage or at least reduce the life of the equipment. The higher the voltage is above this level, the more damage it can cause. Therefore, the output voltage of a surge protection device should not be more than about 30% greater than the design voltage of the equipment or, in the case of standard 120 volt equipment, about 200 volts. Additionally, transient current spikes should be kept to a maximum of about 5 amperes.

In most existing surge protection devices, the load equipment is protected from a transient surge by diverting the surge to ground using clamping components such as crowbar circuits, metal oxide varistors (MOVs), gas discharge tubes and avalanche diodes and/or by blocking the surge from passing into protected equipment using a series blocking inductor or surge reactor.

With the former technique, if there is no good ground connection, very little protection is provided. This is because, if the high magnitude surge cannot find its way to ground, it may be diverted back into the supply. That is, a surge coming from the line, if not diverted to ground, may be diverted to the neutral conductor.

Second, many of such existing surge protection devices use MOVs as a means to divert incoming surges. While MOVs are very economical to use for this purpose, their performance degrades, typically dramatically, with each transient surge to which they are exposed. In normal use, depending on the number of transient surges, the lifetime of a MOV may be, for example, one to two years. Unless the user knows to replace such a surge protector regularly, the effectiveness of such a surge protector becomes limited over time. In most cases, there is no indication that the MOVs of such a device are degraded.

The latter technique of blocking rather than grounding the surge is usually effective in shielding the protected equipment from damage, but may result in damage to nearby unprotected equipment. Since the blocking inductor blocks but does not dissipate the incoming surge, the surge may be diverted. In most surge protection devices, the diversion of the blocked surge goes unnoticed. Thus, in many cases, devices not connected to the surge protector, but connected to the same power source, may be damaged.

SUMMARY OF THE INVENTION

A primary objective of the present invention is to provide a surge protection device that will convert electrical surges to less dangerous forms, such as heat, and permit their dissipation.

Another object of the invention is to provide a surge protector having components which do not degrade upon repeated exposures to surges.

A further objective is to provide cost effective surge protection circuitry adaptable to various different types of power systems, including alternating current, single-phase, two-phase and three-phase, delta- and wye-connected loads, as well as direct current power systems, in which circuitry is shared.

The present invention achieves the foregoing objectives by providing a three-stage surge protection circuit. The circuit, which includes input terminals for connection to an electrical power supply system and output terminals for connection to equipment to be protected, comprises:

a surge dissipation stage coupled to the input terminals for storing and dissipating transient surge energy across the input terminals;

a current limiting stage comprising a plurality of inductors, each of which is coupled in series to a respective conductor from the input terminals, for limiting current surges; and a voltage clamping stage comprising an avalanche diode for clamping the voltage to be supplied to the protected electrical equipment at a predetermined level.

Preferably, the surge dissipation stage includes an avalanche diode for detecting a transient voltage surge across the input terminals, a capacitor for storing energy from said transient voltage surges, and a resistor coupled in parallel with the capacitor for dissipating the energy stored in the capacitor. The surge dissipation stage can also optionally include a second parallel capacitor/resistor combination for storing and dissipating a portion of the surge energy.

The surge protection circuit of the present invention can also be provided in a configuration for protecting electrical equipment powered by a single phase grounded (three conductor) system and/or three-phase power system. In the single phase grounded system, surge suppression means are provided across the hot-neutral conductors, the hot-ground conductors, and the neutral-ground conductors. For three-phase power lines, surge suppression means are provided across the input pair of each phase. Advantageously, each pair of inputs is rectified separately, but the circuitry for detecting, storing and dissipating power surges is shared. Thus, the cost and complexity of circuitry for protecting a three-phase power system using the arrangement of the present invention is not much different from that of a single-phase protection circuit since the first stage of circuitry is shared.

Other features and advantages of the present invention will become apparent when the following description of the preferred embodiment of the invention is read in conjunction with the accompanying drawings.

BRIEF DESCRIPTION OF THE DRAWINGS

FIG. 8 is a schematic diagram of an alternative surge protection circuit for a three-phase, four conductor power system.

DETAILED DESCRIPTION OF THE PREFERRED EMBODIMENTS

Figure 1:
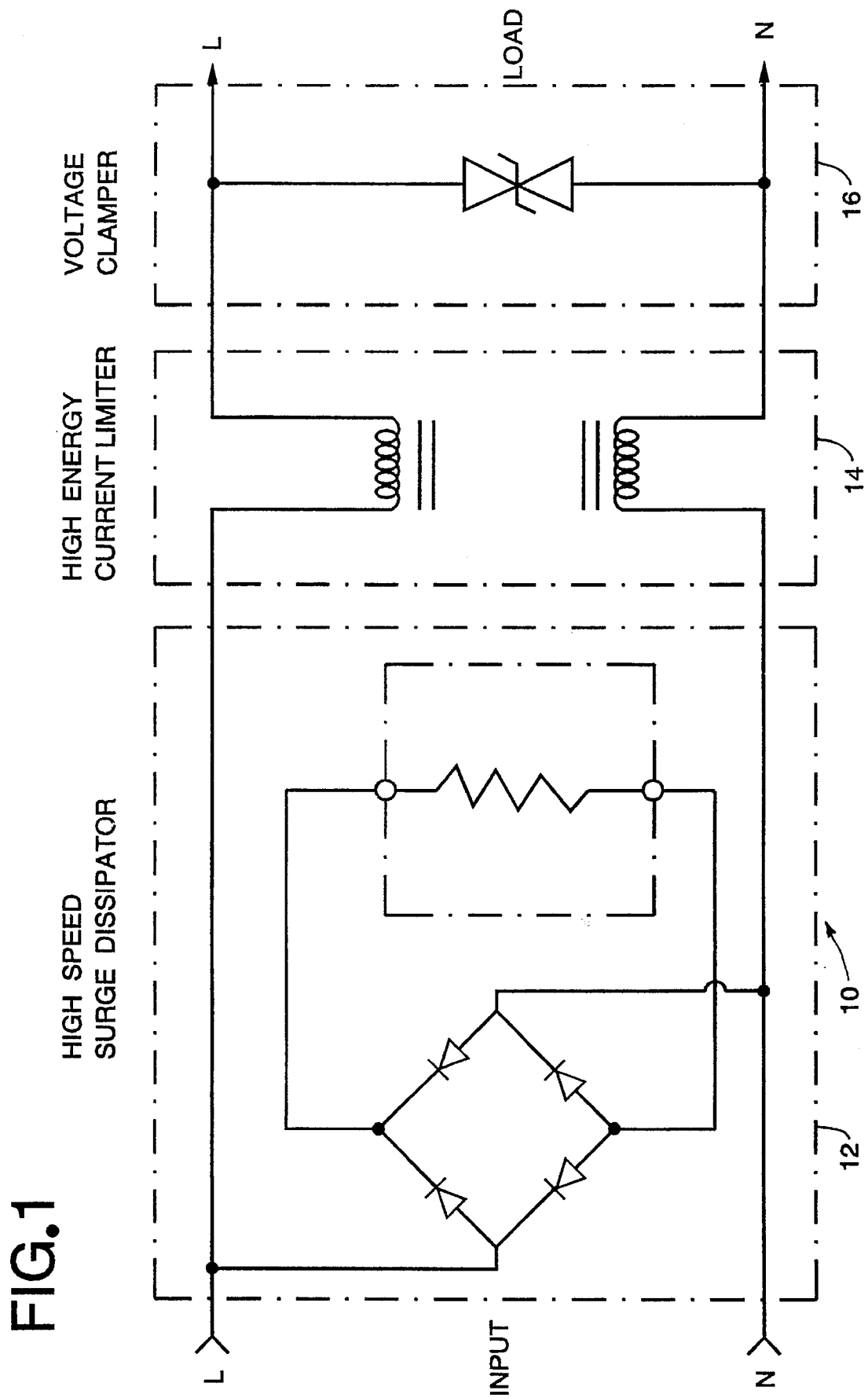
FIG. 1 is a block diagram of the surge protection circuit of the present invention.

Referring first to FIG. 1, the surge protection circuit of the present invention, designated generally by reference numeral 10, is shown in block diagram form. Surge protection circuit 10 includes a first surge suppression stage 12 for dissipating voltage surges, a second surge suppression stage 14 for limiting current from the voltage surge, and a third surge suppression stage 16 for clamping the voltage at an accurate level.

Figure 2:
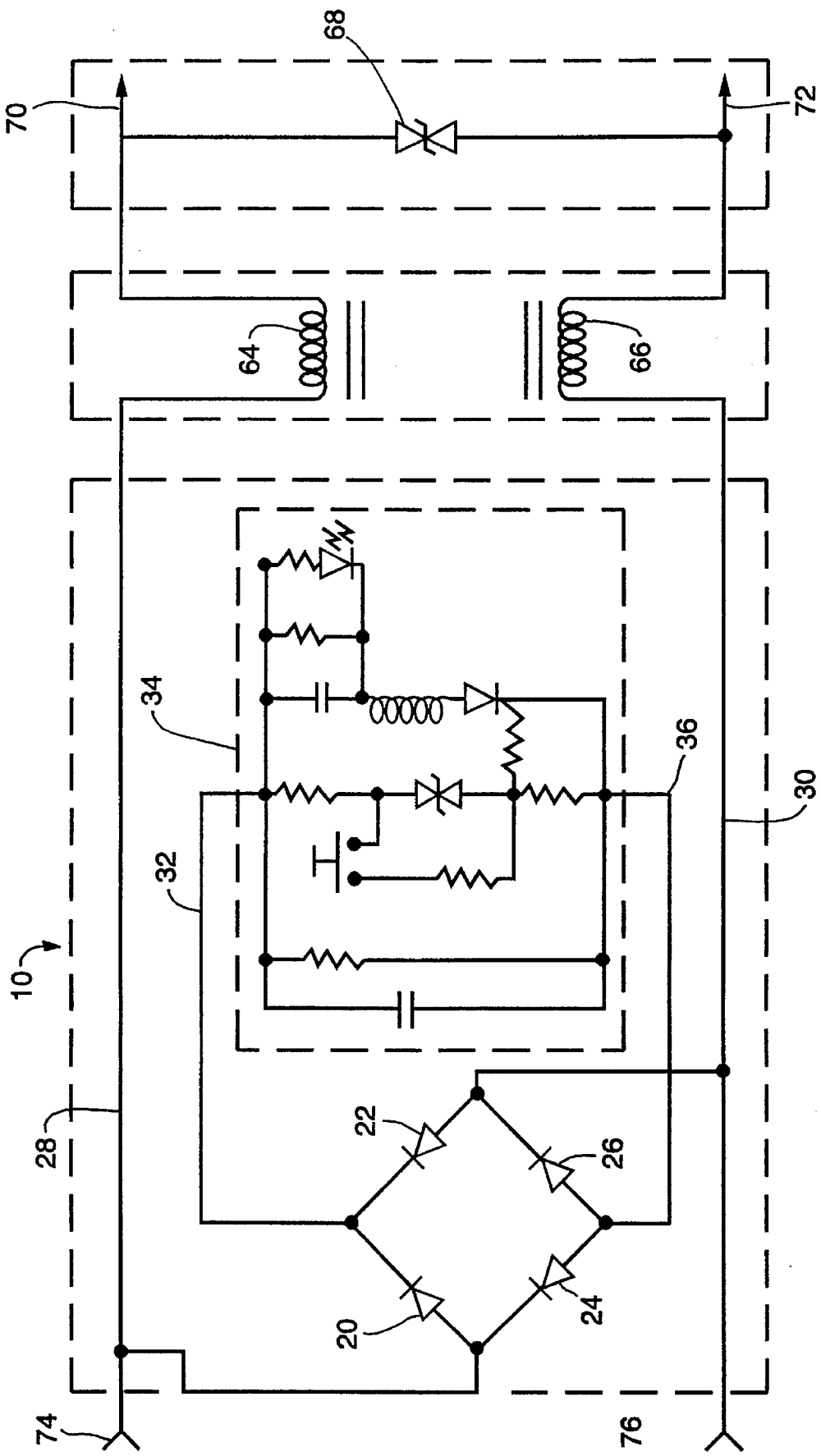
FIG. 2 is a schematic diagram of the surge protection circuit of the present invention.

Referring now to FIG. 2, surge protection circuit 10 includes a full wave bridge rectifier including diodes 20, 22, 24, 26 coupled across the hot conductor 28 and neutral conductor 30 of a 115 VAC line. The joined cathodes of diodes 20, 22 are coupled to a terminal 32 of a surge dissipation circuit 34. The joined anodes of diodes 24, 26 are coupled to a terminal 36 of circuit 34.

Figure 3:
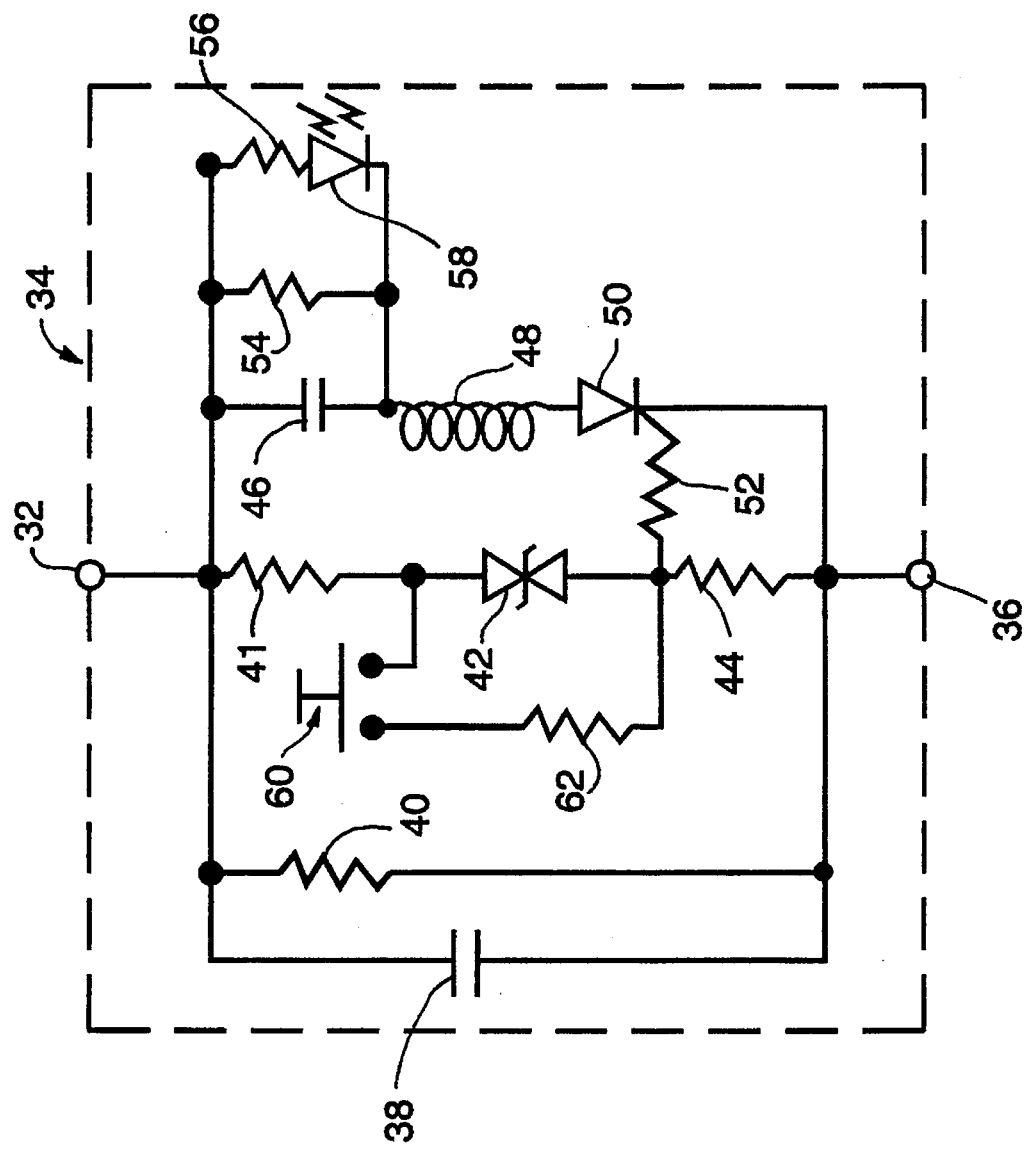
FIG. 3 is a detailed schematic of the first surge suppression stage of the invention for dissipating voltage surges.

As shown in the enlarged schematic of FIG. 3, surge dissipation circuit 34 includes a resistor 41, a bidirectional 200 V avalanche diode 42, and a resistor 44 coupled in series across terminals 32, 36. A series combination of a 150 μF, 400 V electrolytic capacitor 46, an inductor 48 and a SCR 50 is also coupled across terminals 32, 36. The gate electrode of SCR 50 is coupled through a series resistor 52 to the junction of avalanche diode 42 and resistor 44. A press-to-test button 60 and a resistor 62 are coupled across avalanche diode 42. A resistor 54 is coupled across capacitor 46. A series combination of a resistor 56 and an LED 58 also is coupled across capacitor 46.

When a voltage surge occurs across terminals 32 and 36 above operating voltage, avalanche diode 42 conducts, thereby providing a gate voltage to SCR 50, and rendering it conductive. As current flows through SCR 50, capacitor 46 charges, storing the surge energy. The surge energy is then slowly dissipated into harmless heat as capacitor 46 discharges through resistor 54. A small amount of current is diverted to the series combination of resistor 56 and LED 58 to provide a visual indication that surge dissipation circuit 34 has damped a surge.

To enhance the performance of dissipation circuit 34, several optional components may be provided. An additional capacitor 38 will absorb some of the energy of an incoming surge and thereby slow down the initial charging rate of capacitor 46. This will extend the life of electrolytic capacitor 46, since the dielectric insulation of capacitor 46 can be damaged over time. A resistor 40, the counterpart of resistor 54, is provided to dissipate the energy stored in capacitor 38.

Test button 60 is provided to verify that the critical components of dissipation circuit 34, namely SCR 50, capacitor 46 and resistor 54, are operational. Inductor 48 provides a small inductance to prevent false triggering of SCR 50.

Referring back to FIG. 2, surge protection circuit 10 further comprises a second stage 14 comprising a pair of 80 μH inductors 64, 66, coupled in series, respectively, with the hot 28 and neutral 30 conductors from the input terminals. Inductors 64, 66 together comprise a high energy current limiter.

The third stage 16 of surge protection circuit 10 is a finite voltage clamp comprising a 200 V bidirectional avalanche diode 68 coupled across the output terminals 70, 72 of surge protection circuit 10. 200 V is chosen as the clamping value because it is about 15% greater than the peak rated voltage across conductors 28, 30.

In a typical surge suppression, an input surge across conductors 28, 30 of, for example, 6 KV at 3 KA, is reduced by the action of surge dissipation circuit 34 to a voltage in the 300–400 volt range and a current in the 50–100 ampere range. The high energy current limiting function of inductors 64, 66 further reduces the surge current to about 5 amperes. Finally, avalanche diode 68 clamps the surge at 200 volts.

Advantageously, the surge dissipation of the first stage 12 reduces the surge energy sufficiently to permit the use of small, inexpensive inductors in the second stage 14. Likewise, the current limiting function performed by the second stage 14 permits the use of a precise, fast and reliable 200 V avalanche diode 68. Thus, the order of the stages is very important in the present invention.

The surge dissipation circuit 34 is designed to operate from a direct current source, with bridge rectifier 20, 22, 24, 26 performing the necessary AC to DC conversion (if the surge protector of the present invention is to be used in an automobile or with any other DC power source, there is no need for conversion). An additional advantage is obtained from the AC to DC conversion, namely that the surges or spikes, whether positive or negative amplitude, will be converted and thus will be detected by the avalanche diode. Thus, the surge protector of the invention detects surges or spikes, of either positive or negative amplitude, at any position along the sine wave of the input power.

Another point which deserves mention is that, while the embodiment illustrated in FIG. 1 calls for three stages of protection, not all may be needed, depending on the performance desired. For example, the finite voltage clamping stage may not be needed if the desired performance is for the output to simply be less than 330 volts (the lowest category of the UL1449 standard). The surge dissipation circuit 12 and the current limiting stage 14 are sufficient to achieve this result. However, as discussed previously, if all three stages are used, the order of the stages is critical, and must be maintained to provide the optimal performance to cost ratio. For example, if the current limiting stage 14 were to precede the surge dissipation circuit 12 as the first stage of the circuitry, the inductors of the current limiting stage would have to have larger inductances and thus would have to be physically larger and more expensive.

Figure 4:
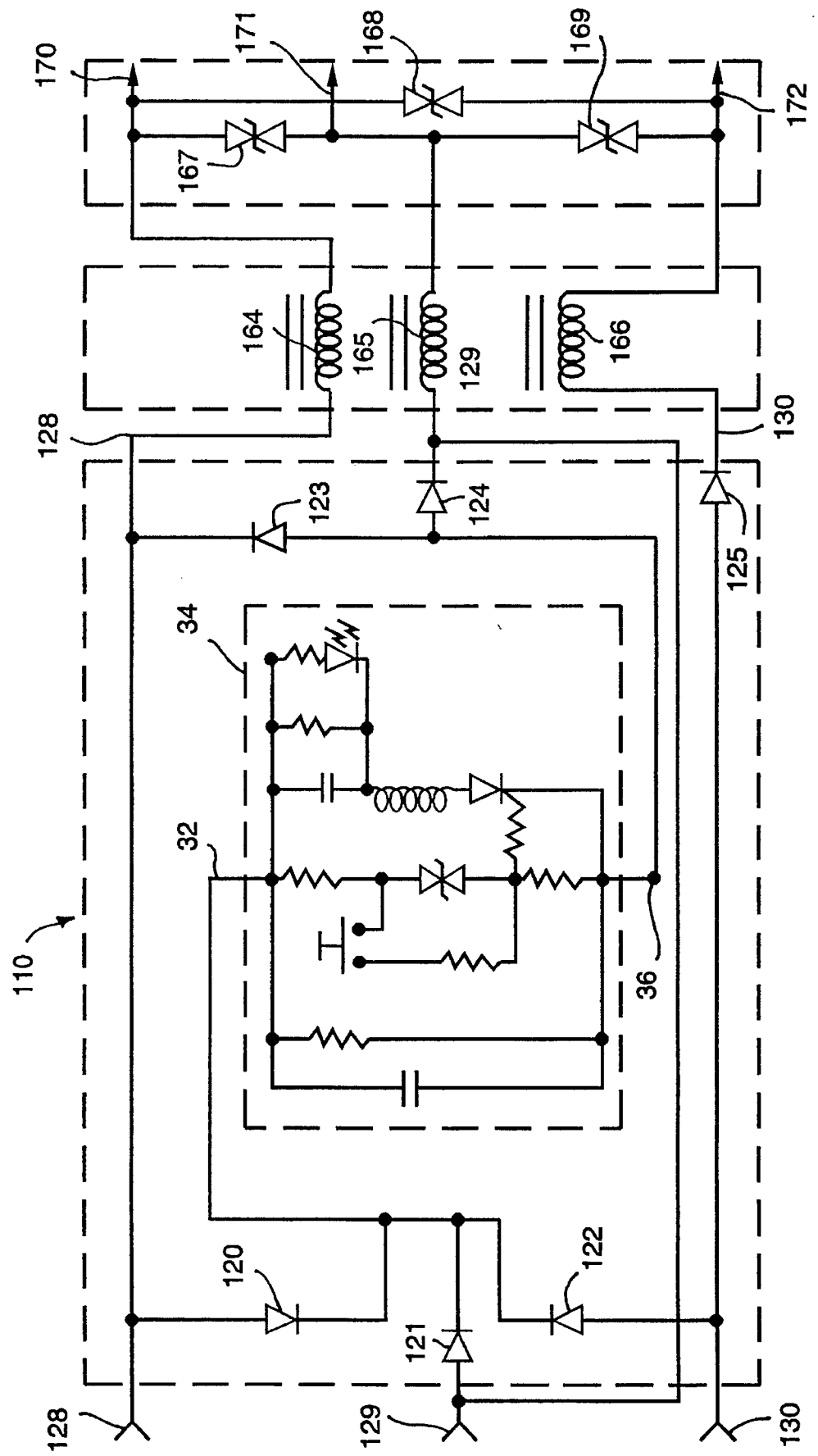
FIG. 4 is a schematic diagram of a surge protection circuit for a three-phase power system.

A surge protection circuit 110 for a three phase power system is illustrated in FIG. 4. Each conductor 128, 129, 130 of the three conductor system is coupled to the anode of a respective diode 120, 121, 122. The cathodes of diodes 120, 121, 122 are coupled to a terminal 32 of a surge dissipation circuit 34. Terminal 36 of surge dissipation circuit 34 is coupled to the anodes of three diodes 123, 124, 125, the cathodes of which are coupled to the conductors 128, 129, 130, respectively. A high energy current limiter comprises 80 μH series inductors 164, 165, 166, respectively, in series with each of the three conductors 128, 129, 130. A finite voltage clamp comprising respective bidirectional avalanche diodes 167, 168, 169 is coupled across each pair of output terminals 170, 171, 172 of surge protection circuit 118. The breakdown voltages of the diodes 167, 168, 169 are 15% higher than the peak rated voltages across the conductor pairs: 128, 129; 128, 130; and 129, 130 respectively, or about 65% higher than the rms rated voltages across these terminal pairs, respectively.

In operation, a power surge across any pair of conductors 128, 129, 130 is once again reduced by the action of a dissipating circuit 34. Note that, although each phase of the three phase system is separately rectified, the power surge in each conductor is suppressed by a single, shared circuit 34.

The high energy current limiting function of inductors 164, 165, 166 limits the surge current.

Finally, avalanche diodes 167, 168, 169 clamp the surge at the precise desired voltage level, i.e., 115% of the peak RMS voltage value.

Figure 5:
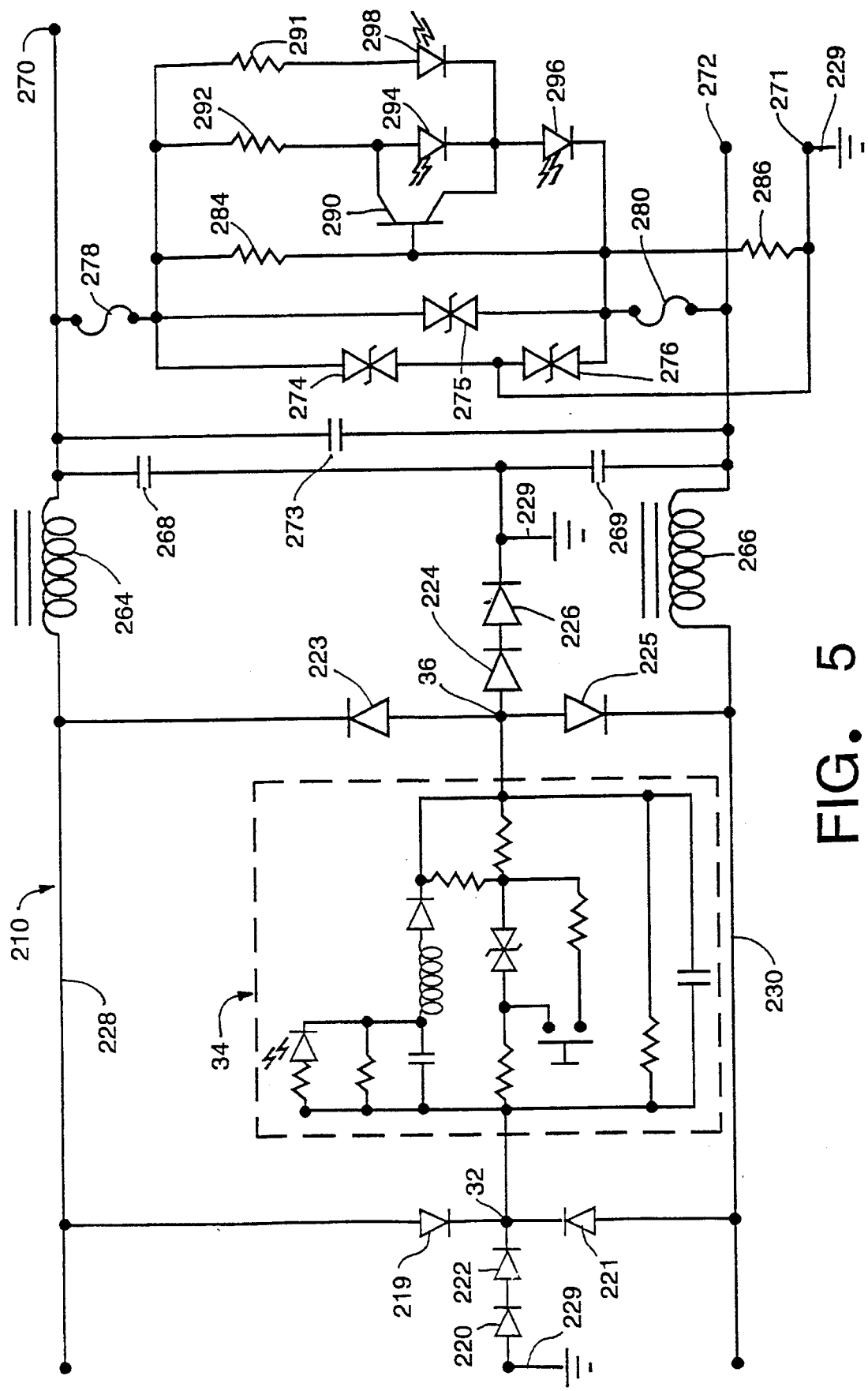
FIG. 5 is a schematic diagram of a surge protection circuit for a three-conductor system in which one conductor is at ground potential.

FIG. 5 illustrates a surge protection circuit 210 for a three conductor system 228, 229, 230, one conductor 229 of which is at ground potential. The remaining conductors 228, 230 in the illustrated system are the hot and neutral conductors, respectively. Each of the three conductors 228, 229, 230 of the three conductor system is coupled to the anode of a diode 219, 220, 221, respectively. The cathode of diode 220 is coupled to the anode of a diode 222. The cathodes of diodes 219, 221, 222 are coupled to a terminal 32 of surge dissipation circuit 34. The terminal 36 of surge dissipation circuit 34 is coupled to the common anodes of three diodes 223, 224, 225. The cathode of diode 224 is coupled to the anode of a diode 226. The cathodes of diodes 223, 225, 226 are coupled to the conductors 228, 229, 230, respectively.

The diode pairs, 220 and 222, and 224 and 226, are necessary because the neutral conductor and the ground conductor, in a single phase grounded system, are usually at almost the same voltage. The additional diode in each pair is used to create a potential difference between the two conductors. This prevents an unwanted surge on the neutral conductor from being diverted to the ground conductor.

A high energy current limiting function is performed by 80 μH series inductors 264, 266, coupled in series, respectively, with conductors 228, 230.

The finite voltage clamp in this embodiment has a somewhat different configuration. Series 0.1 μF, 400 V capacitors 268, 269 are coupled across the output terminals 270, 272. The common terminal of capacitors 268, 269 is coupled to output terminal 271. A 2.2 μF, 400 V capacitor 273 is also coupled across output terminals 270, 272. Bidirectional avalanche diodes 274, 275, 276 are joined in the same configuration as in the embodiment of FIG. 4. Once again, the rated voltages of these diodes are 115% of the peak RMS value. Fuses 278, 280 are coupled between the junctions of avalanche diodes 274, 275, and 275, 276 and output terminals 270 and 272, respectively. The junction of avalanche diodes 274, 276 is coupled directly to output terminal 271. Series resistors 284, 286, respectively, are coupled between fuse 278 and output terminal 271.

The base of a bipolar transistor 290 is coupled to the junction of resistors 284 and 286. The collector of transistor 290 is coupled through a resistor 292 to the common terminal of avalanche diodes 274, 275. The collector of transistor 290 is coupled through an LED 294 to its emitter and through a diode 296 to the common terminal of avalanche diodes 275, 276. The series combination of a resistor 291 and an LED 298 is coupled between the common terminal of avalanche diodes 274, 275 and the emitter of transistor 290.

The finite voltage clamp circuit in the embodiment of FIG. 5 senses the line-to-ground, line-to-neutral, and ground-to-neutral output voltages across terminals 270, 271; 270, 272; and, 271, 272; respectively, and provides visual indications on LED's 294 and 298, respectively, of surge conditions. When surge voltage exists across the line and ground output terminals 270, 271, transistor 290 turns off, turning LED 294 on. When a surge condition exists across the line and neutral output terminals 270, 272, LED 298 turns off, indicating that condition. Avalanche diodes 274, 275, 276 function in the same manner as avalanche diodes 68 and 167, 168, 169 in the embodiments discussed previously. The neutral and ground conductors 230 and 229, respectively, and neutral and ground output terminals 272 and 271, respectively, ordinarily operate at substantially the same potentials. Diodes 222, 226 and 296 provide isolation between the neutral 230 and ground 229 conductors and between the neutral 272 and ground 271 output terminal.

Figure 6:
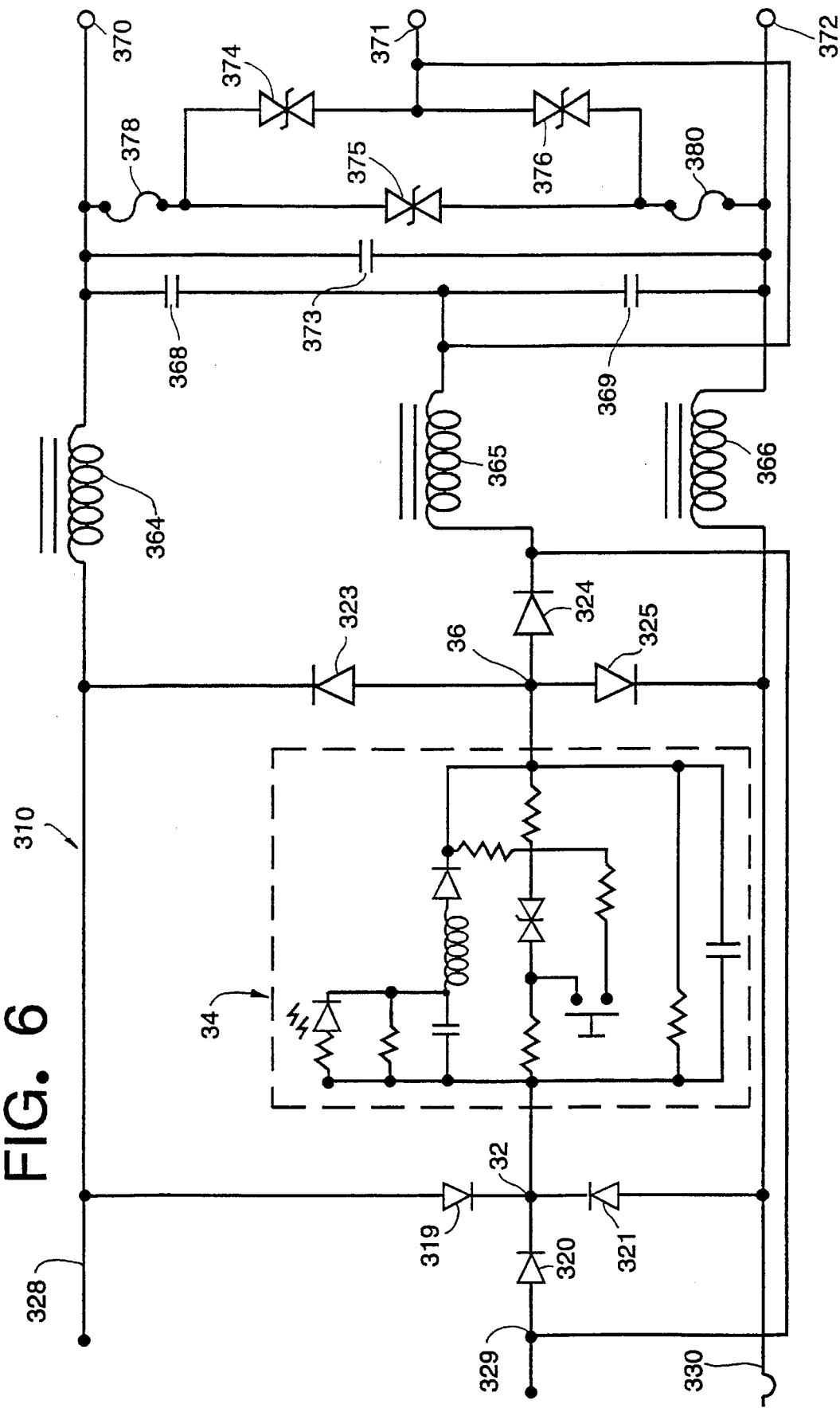
FIG. 6 is a schematic diagram of an alternative surge protection circuit for a three-phase power system.

FIG. 6 illustrates a surge protection circuit 310 for a three-phase power system 328, 329, 330. Each conductor 328, 329, 330 of the three phase power system is coupled to the anode of a diode 319, 320, 321 respectively. The cathodes of diodes 319, 320, 321 are coupled to a terminal 32 of a surge dissipation circuit 34. The terminal 36 of surge dissipation circuit 34 is coupled to the common anodes of three diodes 323, 324, 325. The cathodes of diodes 323, 324, 325 are coupled to the conductors 328, 329, 330, respectively. A high energy current limiter comprises 80 μH series inductors 364, 365, 366, respectively, in conductors 328, 329, 330.

Series 0.1 μF, 400 V capacitors 368, 369 are coupled across the output terminals 370, 372. The common terminal of capacitors 368, 369 is coupled to output terminal 371. A 2.2 μF, 400V capacitor 373 is also coupled across output terminals 370, 372. Bidirectional avalanche diodes 374, 375, 376 are joined in the same configuration as in the embodiments of FIGS. 4–5. Fuses 378, 380 are coupled between the junctions of avalanche diodes 374, 375 and 375, 376 and output terminals 370 and 372, respectively. The junction of avalanche diodes 374, 376 is coupled directly to output terminal 371. The finite voltage clamp circuit in the embodiment of FIG. 6 senses the output voltages across terminals: 370, 371; 370, 372; and, 371, 372; respectively. Avalanche diodes 374, 375, 376 function in a similar manner as avalanche diodes 68 and 167, 168, 169 and 274, 275, 276 in the embodiments discussed previously.

Figure 7:
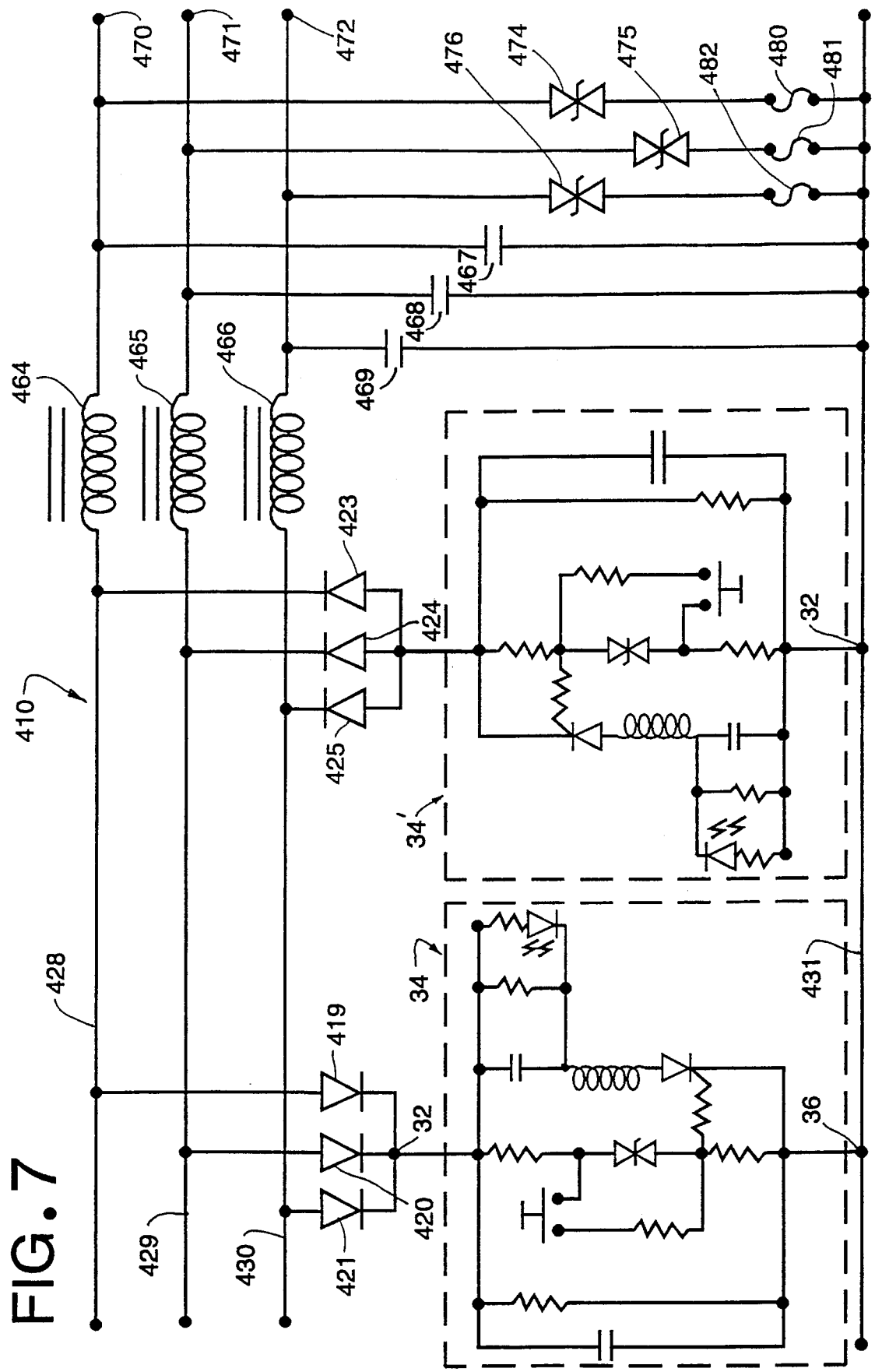
FIG. 7 is a schematic diagram of a surge protection circuit for a three-phase, four conductor power system.

FIG. 7 illustrates a surge protection circuit 410 for a three-phase, four conductor system 428, 429, 430 and 431, one conductor 431 of which is the neutral conductor. Each conductor 428, 429, 430 of the system is coupled to the anode of a diode 419, 420, 421, respectively. The cathodes of diodes 419, 420, 421 are coupled to a terminal 32 of a surge dissipation circuit 34. The terminal 36 of surge dissipation circuit 34 is coupled to the neutral conductor 431. A terminal 32' of a second surge dissipation circuit 34' is coupled to neutral conductor 431. A terminal 36' of the second surge dissipation circuit 34' is coupled to the common anodes of three diodes 423, 424, 425. The cathodes of diodes 423, 424, 425 are coupled to the conductors 428, 429, 430, respectively. A high energy current limiter comprises 80 μH series inductors 464, 465, 466, respectively, in conductors 428, 429, 430.

0.1 μF, 400 V capacitors 467, 468, 469, respectively, are coupled between each of output terminals 470, 471, 472, and the neutral conductor 431. A series combination of a bidirectional avalanche diode 474, 475, 476 and a fuse 480, 481, 482, respectively, is coupled between each output terminal 470, 471, 472, respectively, and the neutral conductor 431. The finite voltage clamp circuit in the embodiment of FIG. 6 senses each hot-to-neutral output voltage across terminals: 470, 431; 471, 431; and 472, 431; respectively. Avalanche diodes 474, 475, 476 function as do avalanche diodes 68; 167, 168, 169; 274, 275, 276; and 374, 375, 376 in the embodiments discussed previously.

Circuit 34 dissipates surges on conductors 428, 429, 430 which are positive with respect to the neutral conductor 431. Circuit 34' dissipates surges on conductors 428, 429, 430 which are negative with respect to the neutral conductor 431.

FIG. 8 illustrates a surge protection circuit 510 for a three-phase, four conductor system 528, 529, 530 and 531, one conductor 531 of which is the neutral conductor. Each conductor 528, 529, 530 of the system is coupled to the anode of a diode 519, 520, 521, respectively. The cathodes of diodes 519, 520, 521 are coupled to a terminal 32 of a surge dissipation circuit 34. The terminal 36 of surge dissipation circuit 34 is coupled to the common anodes of three diodes 523, 524, 525. The cathodes of diodes 523, 524, 525 are coupled to the conductors 528, 529, 530, respectively. Neutral conductor 531 is coupled to the anode of a diode 541, the cathode of which is coupled to terminal 32. Terminal 36 is coupled to the anode of a diode 542, the cathode of which is coupled to neutral conductor 531.

A high energy current limiter is provided by 80 μH series inductors 564, 565, 566, coupled in series, respectively, with conductors 528, 529, 530.

Bidirectional avalanche diodes 574, 575, 576, respectively, are coupled between output terminals 570, 571, 572, respectively, and the neutral conductor 531. The finite voltage clamp circuit in the embodiment of FIG. 8 senses each line-to-neutral output voltage across terminals: 570, 531; 571, 531; and 572, 531; respectively. Avalanche diodes 574, 575, 576 function as do avalanche diodes 68; 167, 168, 169; 274, 275, 276; 374, 375, 376; and, 474, 475, 476 in the embodiments discussed previously.

Circuit 34 dissipates surges on conductors 528, 529, 530 which are positive with respect to the neutral conductor 531 through diode 542, and dissipates surges on conductors 528, 529, 530 which are negative with respect to neutral conductor 531 through diode 541.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A surge protection circuit consisting of three stages and including input terminals for connection to an electrical power supply system and output terminals for coupling to equipment to be protected, said circuit comprising:

a surge dissipation stage comprising a first of said three stages, said surge dissipation stage being coupled to said input terminals including a bidirectional avalanche diode for detecting transient voltage surges, a capacitor coupled across said bidirectional avalanche diode for storing energy from said transient surges, conduction through said capacitor being triggered by said bidirectional avalanche diode, and a resistor coupled across said capacitor for dissipating said energy from said transient surges;

a current limiting stage comprising a second of said three stages, said current limiting stage being coupled between said input terminals and said output terminals on a side of said surge dissipation stage opposite said input terminals, said current limiting stage comprising a plurality of inductors, each of which is coupled in series to a respective conductor from said input terminals for limiting current surges; and a voltage clamping stage comprising a third of said three stages, said voltage limiting stage following said current limiting stage for clamping the voltage at a predetermined level, said voltage clamping stage comprising a plurality of bidirectional avalanche diodes for clamping the voltage at the predetermined level, said bidirectional avalanche diodes being coupled across respective pairs of said output terminals.

2. The circuit of claim 1, wherein said surge dissipation stage further comprises an additional capacitor and resistor coupled in parallel with each other and across said bidirectional avalanche diode for storing and dissipating a portion of the energy from a transient voltage surge.

3. The circuit of claim 1, wherein said electrical power supply system provides single phase AC power, and said surge dissipation stage includes a bridge rectifier circuit for AC to DC conversion of said power from said power supply system.

4. The circuit of claim 1, wherein said electrical power supply system provides power having three phases, and said surge dissipation stage includes a plurality of diodes arranged to rectify each phase of said power from said power supply system, said current limiting stage includes three inductors for limiting current surges, respectively, on each of said three phases, and said voltage clamping stage includes three bidirectional avalanche diodes for providing voltage clamping, respectively, of each of said three phases of power from said power supply system.

5. The circuit of claim 1, wherein said electrical power supply system provides single-phase power on three conductors, and said surge dissipation stage includes a plurality of diodes arranged to rectify said power from said power supply system, said current limiting stage includes a pair of inductors for limiting current surges on each of said conductors connected to said input terminals and said voltage clamping stage includes a plurality of bidirectional avalanche diodes arranged in a circuit which senses line-to-ground, line-to-neutral and ground-to-neutral output voltages and provides a visual indication of voltage surge conditions.

6. The circuit of claim 1, wherein said electrical power supply system provides power having three phases from four conductors, and said surge dissipation stage includes a plurality of diodes arranged to rectify each phase of said power from said power supply system, said current limiting stage includes three inductors for limiting current surges, respectively, on each of said three phases, and said voltage clamping stage includes three bidirectional avalanche diodes for providing voltage clamping, respectively, of each of said three phases of power from said power supply system.

7. A method for providing surge protection of power from an electrical power supply system in a three-stage surge protection circuit, comprising, in the following order, the steps of:

detecting unfiltered transient voltage surges directly from said power supply system using a bidirectional avalanche diode;

storing energy in a first stage of said three-stage circuit from said transient voltage surges using a capacitor coupled across said bidirectional avalanche diode by triggering conduction through said capacitor with said bidirectional avalanche diode, and dissipating said energy from said transient surges using a resistor coupled across said capacitor;

limiting current surges from said power supply system in a second stage of said three-stage circuit; and clamping the resultant voltage at a predetermined level in a third stage of said three-stage circuit.

* * * * *